United States Patent [19]

Kazmierowicz

[11] Patent Number: 4,769,586
[45] Date of Patent: Sep. 6, 1988

[54] BATTERY JUMPER CABLE APPARATUS

[76] Inventor: Thaddeus V. Kazmierowicz, 7853 S. Kedvale, Chicago, Ill. 60652

[21] Appl. No.: 837,307

[22] Filed: Mar. 7, 1986

[51] Int. Cl.⁴ .............................................. H02J 7/00
[52] U.S. Cl. ........................................ 320/26; 320/2; 307/10 BP
[58] Field of Search ........................ 320/2–5, 320/25, 26; 307/10 R, 10 BP; 339/29 B

[56] References Cited

U.S. PATENT DOCUMENTS

| 2,509,239 | 5/1950 | Mattheyses | 320/26 |
| 2,766,418 | 10/1956 | Rice | 320/25 |
| 3,051,887 | 8/1962 | Lind | 320/25 |
| 3,118,101 | 1/1964 | Arber | 320/26 |
| 3,258,672 | 6/1966 | Godshalk et al. | 320/25 |
| 3,259,754 | 7/1966 | Matheson | 307/85 |
| 3,267,301 | 8/1966 | Gignac | |
| 3,281,816 | 10/1966 | Raymond | 320/25 |
| 3,308,365 | 3/1967 | St. John | 320/25 |
| 3,413,487 | 11/1968 | Gershen | 320/26 |
| 3,466,453 | 9/1969 | Greenberg | 307/10 |
| 3,470,440 | 9/1969 | Rheingold et al. | 320/25 |
| 3,571,668 | 3/1971 | Gray | 310/674 |
| 3,593,101 | 7/1971 | Wassink | 320/25 |
| 4,027,223 | 5/1977 | Renz | 320/26 |
| 4,166,241 | 8/1979 | Grant | 320/25 |
| 4,180,746 | 12/1979 | Giuffra | 320/26 |
| 4,217,534 | 8/1980 | Cole | 320/25 |
| 4,238,722 | 12/1980 | Ford | 320/25 |
| 4,258,305 | 3/1981 | Anglin | 320/2 |
| 4,272,142 | 6/1981 | Zapf | 320/25 |
| 4,286,172 | 8/1981 | Millonzi et al. | 320/25 |
| 4,349,774 | 9/1982 | Farque | 320/25 |
| 4,366,430 | 12/1982 | Wright | 320/25 |
| 4,400,658 | 8/1983 | Yates | 320/26 |
| 4,463,402 | 7/1984 | Cottrell | 320/25 |
| 4,527,111 | 7/1985 | Branham | 320/26 |

Primary Examiner—Patrick R. Salce
Assistant Examiner—Anita M. Ault
Attorney, Agent, or Firm—Wood, Dalton, Phillips, Mason & Rowe

[57] ABSTRACT

A battery jumper cable apparatus for safely and correctly coupling a battery to a source of power. The battery jumper cable apparatus includes means for determining the polarity of both the battery and the source of power and thereafter coupling the battery and the source of power, observing proper polarity requirements. The battery jumper cable apparatus only permits the battery and the source of power to be coupled when the battery voltage exceeds a preselected level, the level selected to minimize the possibility of an explosion. A transfer relay is utilized to couple the battery to the source of power.

21 Claims, 3 Drawing Sheets

BATTERY JUMPER CABLE APPARATUS

FIELD OF THE INVENTION

This invention relates generally to a control circuit and more particularly to a control circuit used in association with battery jumper cables.

BACKGROUND OF THE INVENTION

Under certain circumstances an automobile or other vehicle cannot be started when a battery lacks a sufficient charge to provide the necessary current to start an engine in the automobile. Such a situation is more likely to exist under cold weather conditions. When the battery charge is inadequate it is necessary to "jump start" the automobile from a charged power source. Frequently, a battery in a second automobile fills the need of a charged power source.

Battery jumper cables have been used to couple the discharged battery to the charged battery. The jumper cables typically consist of a pair of conductors with a pair of battery clamps at either end. Each battery has a positive or plus terminal and a negative or minus terminal, representing the relative voltage levels at the two terminals. With such an arrangement it is necessary to use the jumper cables to couple the plus terminals of each battery together, as well as the minus terminals of each battery together, in a parallel configuration.

Depending upon the position and condition of the battery in the automobile it is not always easy to see terminal identification markings on the battery. Furthermore, in cold weather conditions it is desirable to spend a minimum amount of time in connecting the jumper cables to the respective batteries. Yates, U.S. Pat. No. 4,400,658, describes jumper cables which can be utilized without regard to which is the plus or the minus terminal on each battery. However, the Yates patent requires the use of non-standard and obsolete components in its construction.

An additional problem with prior art jumper cables is the danger which exists when jump starting a vehicle having a battery which is frozen or completely discharged. An excessive current, such as in a starting condition, through a completely discharged battery may cause the battery to errupt. Similarly, when a battery is frozen a large current causes a build-up of hydrogen gas and heat in the battery. If warping of plates inside the battery occurs there may be sparking, causing the gas to ignite, thereby exploding the battery.

The present invention is intended to overcome these and other problems with battery jumper cables.

SUMMARY OF THE INVENTION

It is an object of this invention to provide a battery starter apparatus for correctly and safely coupling terminals of a battery to a source of power.

More specifically, a battery starter apparatus includes a pair of conductors, with means for connecting the pair of conductors to a battery thereby causing one of the conductors to be at a higher relative potential and the other of the conductors of the pair to be at a lower relative potential due to the polarity of the battery. A control circuit is coupled to the pair of conductors and to the source of power. The control circuit includes means for determining the polarity of the battery and thereafter coupling the conductor of the pair at the highest potential to higher relative voltage means of the power source, and the conductor of the pair at the lower potential to lower relative voltage means of the power source. The control circuit only couples the pair of conductors to the power source when a potential difference between the pair of conductors exceeds a preselected level.

Another object of this invention is the use of a plurality of diodes, the diodes assuming a forward biased state or a reverse biased state according to the polarity of the battery.

Yet another object of this invention is to use a plurality of opto-isolators for controlling the coupling of the conductors in response to the determining means.

Still another object of this invention is to provide a control circuit utilizing a zener diode wherein a preselected potential difference is selected according to a breakdown voltage of the zener diode.

Yet a further object of this invention is to provide a control circuit for a battery starter apparatus using a transfer relay to couple a battery to a source of power.

Further features and advantages of the invention will readily be apparent from the specification and from the drawings.

DETAILED DESCRIPTION OF THE PREFERRED EMBODIMENTS

Figure 1:
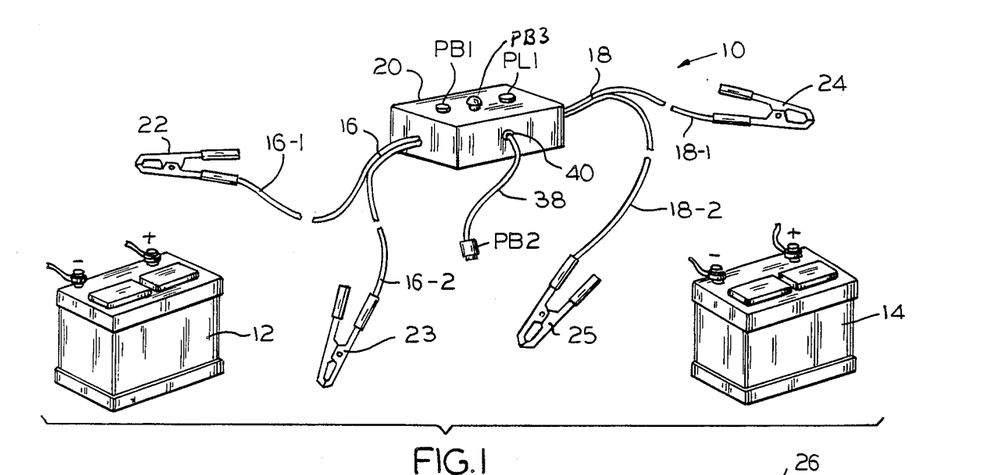
FIG. 1 is a perspective view illustrating an embodiment of the present invention.

Referring first to FIG. 1, an embodiment 10 of the present invention is illustrated in conjunction with a pair of automotive batteries 12, 14. Typically, each of the batteries 12, 14 has a + (PLUS) terminal and a − (MINUS) terminal, with the + and − terminals indicating polarity of the battery. For example, the + terminal may have a potential of +12 Vdc, with the − terminal being at 0Vdc.

Each of the batteries 12, 14 provides electrical power to its associated vehicle (not shown). However, where either battery 12, 14 is not charged sufficiently to start the vehicle it is necessary to replace the battery or jump start the vehicle from an alternative power source. Often this power source is in the form of a charged battery in another vehicle.

In the following discussion, it is presumed that the reference numeral 12 indicates an adequately charged battery in a vehicle, with the reference numeral 14 indicating a discharged battery in a disabled vehicle. The charged battery 12 is therefore coupled to the discharged battery 14 to jump start the disabled vehicle.

The vehicle starter, or jumper cable, apparatus 10 includes a first pair 16 and a second pair 18 of conductors. One end of each of a first and a second conductor 16-1, 16-2 of the first pair 16 extend into an enclosure 20 where they are connected to a control circuit, the control circuit discussed in greater detail hereinafter. Similarly, one end of a third and a fourth conductor 18-1, 18-2 of the second pair 18 also extends into the enclosure 20 where the conductors 18-1, 18-2 are also coupled to the control circuit.

At an opposite end of each of the conductors 16-1, 16-2, 18-1 and 18-2 is a respective connector 22–25 for coupling the conductor to a battery terminal. The connectors 22–25 may for example be battery clamps. To jump start the disabled vehicle from the charged battery 12 the conductors 16-1, 16-2 of the first pair 16 are coupled to the terminals of the charged battery 12 with their associated battery clamps 22, 23. Likewise, the conductors 18-1 and 18-2 are coupled to the terminals of the discharged battery 14 with their associated battery clamps 24, 25. As will become apparent in further discussion either clamp 22, 23 or 24, 25 of each pair 16, 18 can be connected to either the + or − terminal of the associated battery. This result is unlike that obtained with standard jumper cables where a user must follow certain guidelines to properly and safely couple the batteries.

While the first pair of conductors 16 is indicated as coupled to the charged battery 12 and the second pair of conductors 18 is indicated as coupled to the discharged battery 14, such an arrangement is not required. The jumper cable apparatus 10 operates regardless of which pair of conductors 16, 18 is coupled to either battery 12, 14.

When the pair of conductors 16 or 18 is coupled to the terminals of the battery 12 or 14, the conductor coupled to the + terminal is at a higher relative potential, while the conductor coupled to the − terminal is at a lower relative potential. A potential difference between the conductors in a pair 16 or 18 is thus determined by the voltage of the associated battery 12 or 14.

Figure 2:
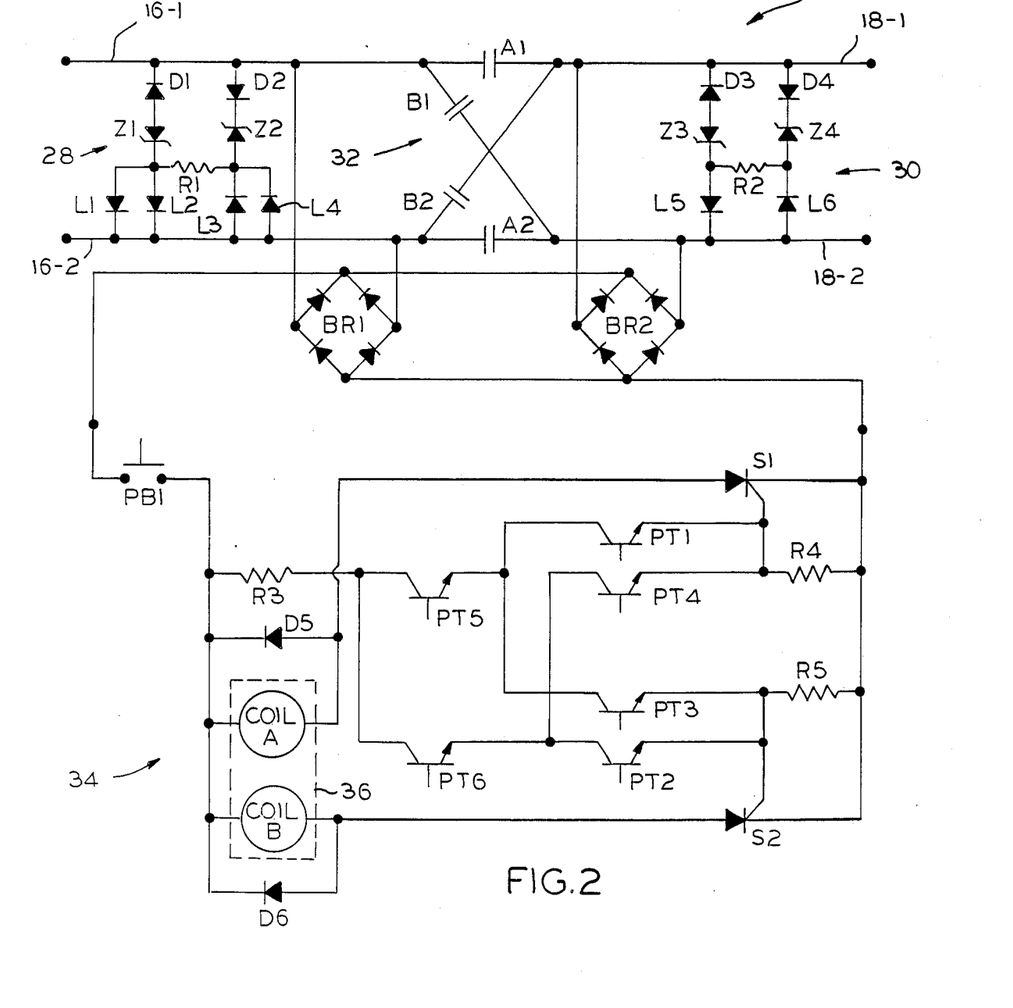
FIG. 2 is an electrical schematic of an embodiment of the resent invention.

Referring now to FIG. 2, an electrical schematic represents a control circuit 26 for one embodiment of the present invention. The control circuit 26 includes a first sensing circuit 28, a second sensing circuit 30, a switching circuit 32 and a logic circuit 34. The sensing circuits 28, 30 determine the polarity of their associated batteries 12, 14 when the jumper cable apparatus 10 is connected to the batteries 12, 14. The logic circuit 34, responsive to the sensing circuits 28, 30, then controls the switching circuit 32 thereby coupling the terminals of the batteries 12, 14 allowing the disabled vehicle to be jump started.

The first sensing circuit 28 includes a steering diode D1 and series zener diode Z1 coupled to the first conductor 16-1. Also coupled to the first conductor 16-1 is a steering diode D2 and series zener diode Z2. The zener diode Z1 is coupled to parallel light emitting diodes (LED's) L1, L2 and a current limiting resistor R1. Similarly, the zener diode Z2 is coupled to parallel LED's L3, L4 and to the resistor R1. The LED's L1-L4 form part of opto-isolators and are in turn coupled to the second conductor 16-2.

When the first conductor 16-1 is coupled to the + terminal of the charged battery 12 and the second conductor 16-2 is coupled to the − terminal of the charged battery 12, the steering diode D2 and the LED's L1, L2 are forward biased, and the steering diode D1 and the LED's L3, L4 are reverse biased. If the potential difference between the conductors 16-1, 16-2 exceeds a breakdown voltage of the zener diode Z2, current is conducted through the steering diode D2, the zener diode Z2, the resistor R1 and the LED's L1, L2, thereby illuminating the LED's L1, L2.

Similarly, when the first conductor 16-1 is coupled to the − terminal of the charged battery 12 and the second conductor 16-2 is coupled to the + terminal of the charged battery 12, the steering diode D1 and the LED's L3, L4 are forward biased, and the steering diode D2 and the LED's L1, L2 are reverse biased. If the potential difference between the conductors 16-1, 16-2 exceeds a breakdown voltage of the zener diode Z1, current is conducted through the steering diode D1, the zener diode Z1, the resistor R1 and the LED's L3, L4, thereby illuminating the LED's L3, L4.

The value of the current limiting resistor R1 is selected to limit current through the LED's L1-L4. The zener diodes Z1, Z2 are selected having a breakdown voltage to prevent conduction when the battery voltage is less than what is considered a safe minimum voltage to couple the batteries and jump start the vehicle.

The second sensing circuit 30 is similar in operation to the first sensing circuit 28 and therefore will not be discussed in detail. However, the second sensing circuit 30 has two individual LED's L5, L6 rather than the two sets of parallel LED's L1, L2 and L3, L4 as in the first sensing circuit 28. The second sensing circuit uses only two LED's L5, L6 instead of four in order to simplify the overall control circuit 26 as would be apparent to those skilled in the art.

Therefore, when the third conductor 18-1 is coupled to the + terminal of the discharged battery 14 and the fourth conductor 18-2 is coupled to the − terminal of the discharged battery 14, with the voltage of the discharged battery 14 exceeding a breakdown voltage of a zener diode Z4, the LED L5 will be illuminated. Likewise, when the third conductor 18-1 is coupled to the − terminal of the discharged battery 14 and the fourth conductor 18-2 is coupled to the + terminal of the discharged battery 14, with the voltage of the discharged battery 14 exceeding a breakdown voltage of a zener diode Z3, the LED L6 will be illuminated.

Associated with the logic circuit 34 and the switching circuit 32 is a transfer relay 36. The transfer relay 36 has two coils COIL A, COIL B, and related normally open contacts A1, A2 and B1, B2. The contact A1 couples the first conductor 16-1 with the third conductor 18-1 and the contact A2 couples the second conductor 16-2 with the fourth conductor 18-2. The contact B1 couples the first conductor 16-1 with the fourth conductor 18-2, and the contact B2 couples the second conductor 16-2 with the third conductor 18-1.

The transfer relay 36 is normally in a first state with both coils COIL A, COIL B being deenergized and all of the contacts A1, A2, B1 and B2 being in an open position Consequently none of the conductors L6-1 16-2 18-1 and 18-2 are coupled to one another in the first state. The transfer relay 36 also has a second state where COIL A is energized and COIL B is deenergized and a third state where COIL A is deenergized and COIL B is energized. Contacts A1, A2 assume a closed position only when COIL A is energized while the contacts B1, B2 assume a closed position only when COIL B is energized. The particular state of the transfer relay 36 at any given time is determined by the logic circuit 34.

A first and a second bridge rectifier BR1, BR2 are coupled to the first and second pairs of conductors 16, 18 respectively. The bridge rectifiers BR1, BR2 provide power to the logic circuit 34 from the charged battery 12 without regard to the polarity of the connection between the pairs of conductors 16, 18 and the batteries 12, 14.

Coupled to the bridge rectifiers BR1, BR2 is a push button PB1. The push button PB1 provides a safety feature preventing the jumper cable apparatus from coupling the terminals of the batteries 12, 14 until a user depresses the push button PB1. Although a push button is shown in the circuit, many different prior art switches could be substituted for the push button. In fact, the circuit would also function properly without the use of a push button or switch.

The transfer relay 36 of the logic circuit 34 includes the two coils COIL A, COIL B, with each of the coils having a diode D5, D6 respectively, in parallel. The diodes D5, D6 provide a path for the discharge of current formed by a collapsing flux field of the associate coils COIL A and COIL B. Coupled between COIL A and the rectifiers BR1, BR2 is a silicon controlled rectifier (SCR) S1. The SCR S1 acts as a switch to controlably energize COIL A. Similarly, another SCR S2 is coupled between COIL B and rectifiers BR1, BR2, to controllably energize COIL B.

While the switching devices shown are SCR's other switching devices, such as transistors or relays, could also be utilized. Modifications required to accommodate these alternate switching devices would be familiar to one skilled in the art.

Completing the logic circuit 34 is a network of six photo-transistors PT1–PT6 for controlling the SCR's S1, S2. Three resistors R3–R5 are coupled in the logic circuit to act as a voltage divider for biasing the SCR's S1, S2.

The photo-transistors PT1–PT6 are also part of the opto-isolators previously discussed. Each of the photo-transistors PT1–PT6 is associated with one of the LED's L1–L6 respectively. That is, the LED L1 is part of an opto-isolator with photo-transistor PT1, etc. The photo-transistors PT1–PT6 act as switches, conducting current only when its associated LED L1–L6 is illuminated. Therefore, according to which of the phototransistors PT1–PT6 in combination are conducting current, the logic circuit 34 determines which if either of the two coils COIL A, COIL B is to be energized.

In view of the above discussion regarding the various circuits, the operation of the jumper cable apparatus 10 will now be discussed according to the various configurations used to connect the jumper cable apparatus 10 to the respective batteries 12, 14.

When the first conductor 16-1 is coupled to the + terminal and the second conductor 16-2 is connected to the − terminal of the charged battery 12, and the third conductor 18-1 is connected to the + terminal and the fourth conductor 18-2 is connected to the − terminal of the discharged battery 14, the LED's L1, L2 and L5 are illuminated, assuming both batteries 12, 14 have a voltage exceeding the breakdown voltage of the zener diodes Z2, Z4. Because the LED's L1, L2 and L5 are illuminated, their associated photo-transistors PT1, PT2 and PT5 conduct current. When push button PB1 is depressed, assuming a closed state, current flows through the push button PB1, the resistor R3, the photo-transistors PT5, PT1 and the resistor R4, thereby switching the SCR S1 on, which energizes COIL A. Although the photo-transistor PT2 is also conducting current, its associated series photo-transistor PT6 does not conduct, due to the LED L6 not being illuminated. The SCR S2 is therefore not switched on and COIL B remains deenergized.

With COIL A energized the transfer relay 36 is in the second state. The contacts A1, A2 close coupling the first conductor 16-1 with the third conductor 18-1 and the second conductor 16-2 with the fourth conductor 18-2. Consequently, the + terminals of the respective batteries 12, 14 are coupled together, as are the − terminals of the respective batteries 12, 14. The disabled vehicle may then be started using the available current from both the charged battery 12 and the discharged battery 14.

If, however, the discharged battery 14 lacks a sufficient voltage, due to cold weather or any other reason, the zener diode Z4 of the second sensing circuit 30 prevents the LED L5 from illuminating. Therefore, the photo-transistor PT5 does not conduct current, preventing COIL A from energizing. Consequently, the disabled vehicle cannot be jump started from the charged battery 12. This is a safety feature intended to minimize the possibility of the discharged battery 14 exploding.

For purposes of the following examples it is assumed that both batteries 12, 14 have a sufficient voltage to be safely coupled to one another.

When the first conductor 16-1 is connected to the + terminal and the second conductor 16-2 is connected to the − terminal of the charged battery 12, and the third conductor 18-1 is connected to the − terminal and the fourth conductor 18-2 is connected to the + terminal of the discharged battery 14 the LED's L1, L2 and L6 are illuminated. Because L1, L2 and L6 are illuminated the photo-transistors PT1, PT2 and PT6 conduct current. When the push button PB1 is depressed current flows through the push button PB1, the resistor R3, the phototransistors PT6, PT2 and the resistor R5, thereby switching the SCR S2 on, which energizes COIL B. The transfer relay 36 is then in the third state. With COIL B energized the contacts B1, B2 close, coupling the first conductor 16-1 with the fourth conductor 18-2 and the second conductor 16-2 with the third conductor 18-1.

When the first conductor 16-1 is coupled to the − terminal and the second conductor 16-2 is connected to the + terminal of the charged battery 12, and the third conductor 18-1 is coupled to the + terminal and the fourth conductor 18-2 is coupled to the − terminal of the discharged battery 14, the LED's L3, L4 and L5 are illuminated causing the photo-transistors PT3, PT4 and PT5 to conduct current. When the push button PB1 is depressed current flows through the push button PB1, the resistor R3, the photo-transistors PT5, PT3 and the resistor R5, thereby switching the SCR S2 on which energizes COIL B. Again, with COIL B energized, the third state of the transfer relay 36, the contacts B1 and B2 close, coupling the first conductor 16-1 with the fourth conductor 18-2 and the second conductor 16-2 with the third conductor 18-1.

When the first conductor 16-1 is coupled to the − terminal and the second conductor 16-2 is coupled to the + terminal of the charged battery 12, and the third conductor 18-1 is coupled to the − terminal and the fourth conductor 18-2 is coupled to the + terminal of the discharged battery 14, the LED's L3, L4 and L6 are illuminated causing the photo-transistors PT3, PT4 and PT6 to conduct current. When the push button PB1 is depressed, current will flow through the push button PB1, the resistor R3, the photo-transistors PT4, PT6 and the resistor R4, thereby switching the SCR S1 on, which energizes COIL A. Once again with COIL A energized and the transfer relay 36 in the second state, the contacts A1, A2 close thereby coupling the first conductor 16-1 with the third conductor 18-1 and the second conductor 16-2 with the fourth conductor 18-2.

As the above examples indicate, no matter which conductor in the pair 16, 18 is coupled to the + or − terminal of the batteries 12, 14, the end result is that the + terminal of the charged battery 12 is coupled with the + terminal of the discharged battery 14 and the − terminal of the charged battery 12 is coupled with the − terminal of the discharged battery 14. Furthermore, such coupling only takes place when both batteries 12, 14 have a sufficient voltage present between their + and − terminals so as to prevent a possible explosion or other damage.

Figure 3:
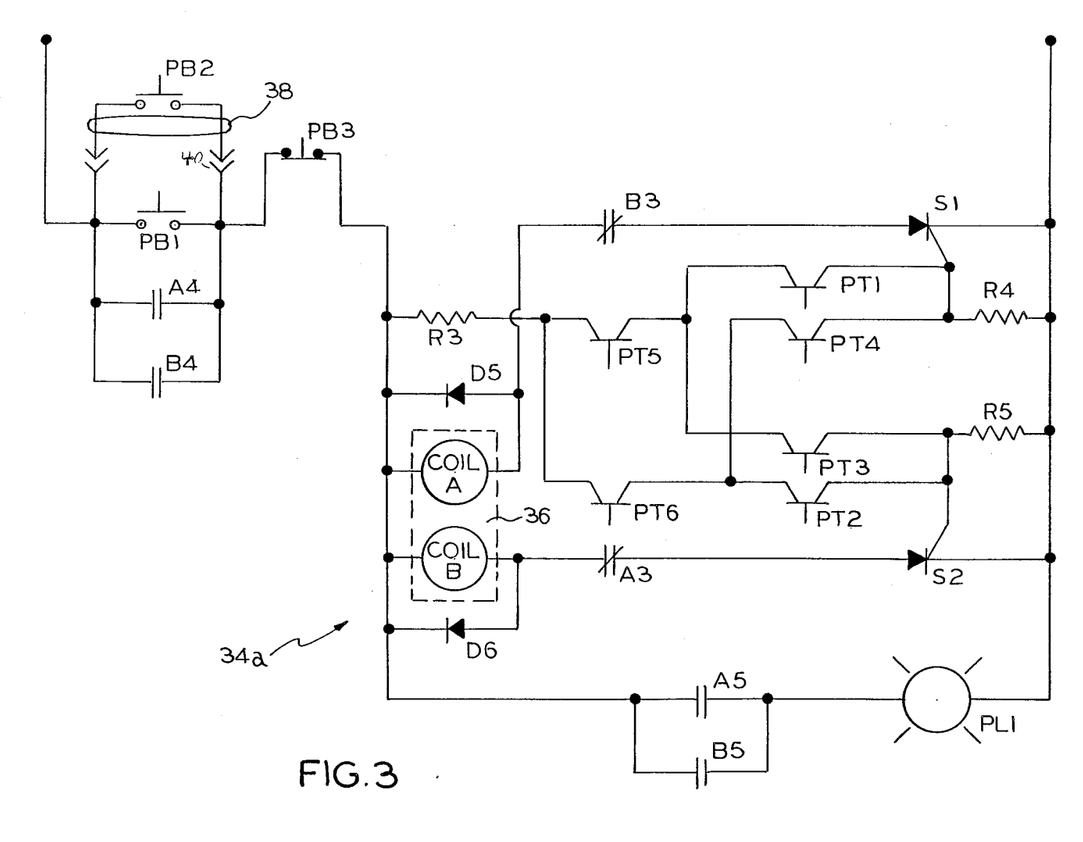
FIG. 3 is a partial electrical schematic of another embodiment of the present invention.

With reference now to FIG. 3, an electrical schematic represents a logic circuit 34a for another embodiment of the present invention. This logic circuit 34a includes all of the elements of the previously discussed logic circuit 34 with the addition of several components which will be discussed below. This logic circuit 34a can be substituted for the logic circuit 34 in the control circuit 26 of FIG. 2.

Under normal operating conditions the two coils COIL A, COIL B will never be energized simultaneously. However, if certain components were to fail and/or a short circuit were present, it is possible that both coils COIL A, COIL B in the logic circuit 34 could be energized. Such a result produces a short circuit across the terminals of each of the batteries 12, 14. It is therefore desirable to prevent the possibility of both coils COIL A, COIL B being energized.

One technique used to prevent the coils COIL A, COIL B from being energized simultaneously is to employ a mechanical interlock to physically prevent one of the coils from being energized when the other coil is already energized. Alternately, additional contacts A3, B3 associated with the coils COIL A, COIL B respectively, are placed in the logic circuit 34a. The contact B3 is normally closed and is placed in series with COIL A, while the contact A3, also normally closed, is in series with COIL B. As a result, when COIL A is energized the normally closed contact A3 opens thereby preventing COIL B from being energized. Similarly, when COIL B is energized the normally closed contact B3 opens thereby preventing COIL A from being energized.

The push button PB1 is installed in the enclosure 20 which would commonly be positioned outside of and between the two vehicles. Since it is necessary for the user to be inside of the vehicle, assistance is required in order to actuate the push button PB1, outside the vehicle. Accordingly, a remote push button PB2 can be located at a distance from the enclosure as shown in FIG. 1. The remote push button PB2 is coupled in parallel to the push button PB1 with a pair of conductors 38. The conductors 38 exit the enclosure 20, with the length of the conductors 38 being determined so that the remote push button PB2 may be carried into the vehicle. A plug 40 can also be included to allow the remote push button PB2 to be removed if desired.

If the push buttons PB1, PB2 are momentary type, the conductors 16-1, 16-2, 18-1 and 18-2 are only coupled when one of the push buttons PB1, PB2 is manually held in the depressed position. The use of momentary push buttons is desirable for allowing fast and easy removal of the coupling once the vehicle has started. The user simply releases the push button PB1 or PB2. However, where it is objectionable to continually depress the push button PB1 or PB2 for the jumper cable apparatus 10 to continue to function, maintained type push buttons could be substituted. Also, hold-in contacts A4, B4 could be included in parallel with the push buttons PB1, PB2. The contact A4 is associated with COIL A and the contact B4 is associated with COIL B. When either COIL A or COIL B is energized its associated hold-in contact A4, B4 closes maintaining a completed circuit bypassing the push buttons PB1 PB2 Where hold in contacts A4, B4 are used a series push button PB3, having a normally closed contact, is included. When one of the hold-in contacts A4, B4 is closed, maintaining the operation of the jumper cable apparatus, the push button PB3 is depressed to open the circuit thereby deenergizing the coils COIL A, COIL B and opening their associated hold-in contacts A4, B4. Thereafter, one of the push buttons PB1, PB2 must again be depressed in order for the jumper cable apparatus 10 to couple the pairs of conductors 16, 18. The push button PB3 is shown mounted in the enclosure 20, but may also be remote from the enclosure 20.

It is often beneficial to have a visual indication when the control circuit 26 has coupled the terminals of the two batteries 12, 14. Hence, parallel auxiliary contacts A5, B5, associated with COIL A and COIL B respectively, are coupled in series with a pilot light PL1. The pilot light is installed in the enclosure 20. When either coil COIL A, COIL B is energized the associated auxiliary contact A5 or B5 closes causing the pilot light PL1 to illuminate.

While the circuit of FIG. 3 includes several options to the circuit of FIG. 2, it is possible to utilize any of these options individually. This allows multiple variations of the jumper cable apparatus 10 to be provided according to a particular users needs.

Figure 4:
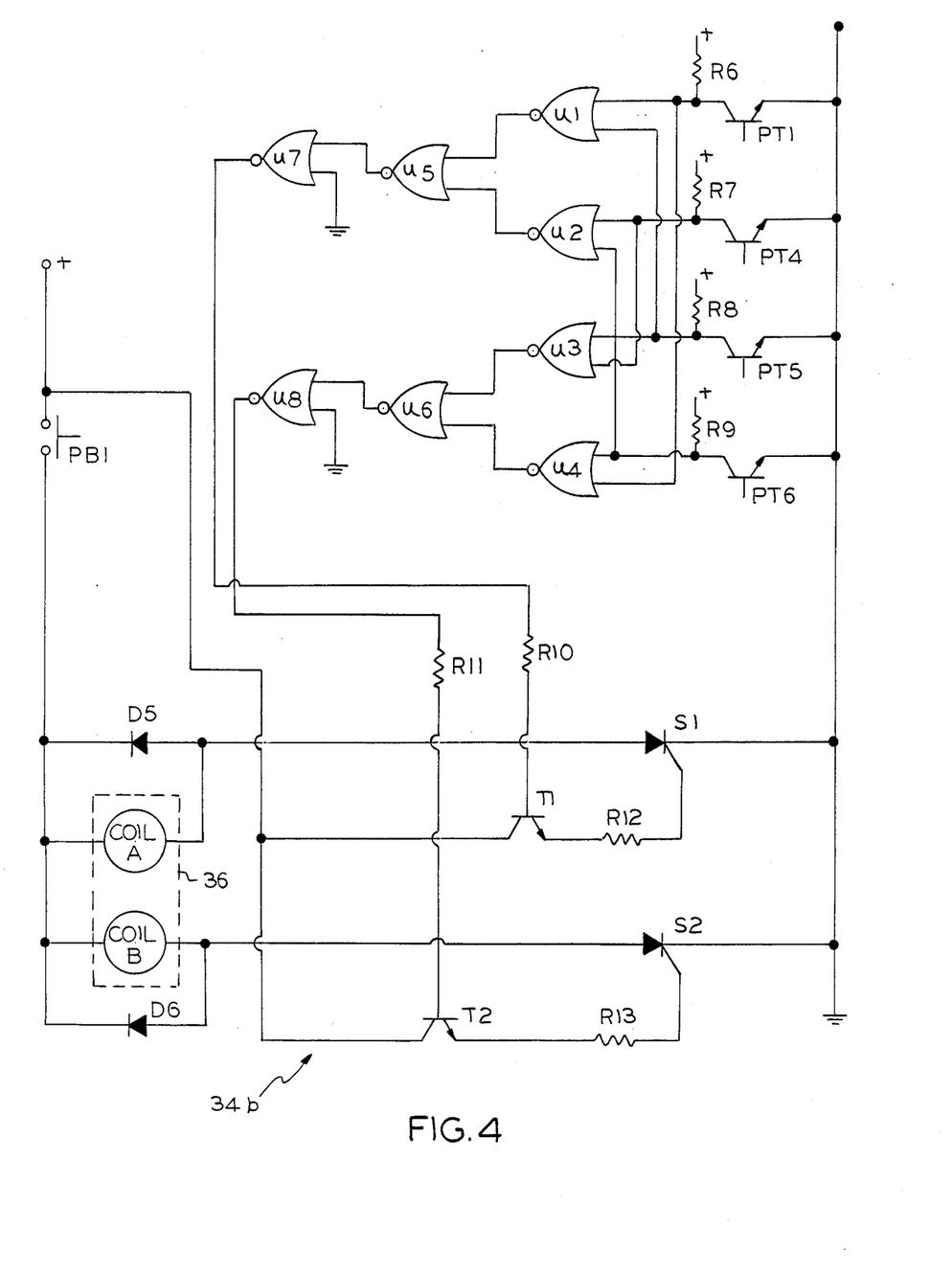
FIG. 4 is a partial electrical schematic of yet another embodiment of the present invention.

With reference now to FIG. 4, an electrical schematic represents a logic circuit 34b for yet another embodiment of the present invention. This logic circuit 34b utilizes many of the components previously discussed with reference to the prior figures, with like reference numerals relating to like components. Hereagain, the logic circuit 34b can be substituted for the logic circuit 34 in the control circuit 26 of FIG. 2.

In FIG. 4 a logic network comprising a plurality of NOR gates and photo-transistors replaces the network of photo-transistors previously discussed with reference to FIGS. 2 and 3. Herein, four of the phototransistors PT1, PT4, PT5 and PT6 are utilized with the phototransistors PT2 and PT3 being eliminated. This elimination renders the LED's L2 and L3 unnecessary so that only four opto-isolators are required. The phototransistors PT1, PT4, PT5 and PT6 along with associated resistors R6–R9, respectively, are coupled to a network of eight two input NOR gates U1–U8. More particularly, the photo-transistors PT1 and PT5 are coupled to the NOR gate U1; the photo-transistors PT4 and PT6 are coupled to the NOR gate U2; the photo-transistors PT4 and PT5 are coupled to the NOR gate U3; and the photo-transistors PT1 and PT6 are coupled to the NOR gate U4. Outputs of the NOR gates U1 and U2 are in turn coupled to the NOR gate U5, while outputs of the NOR gates U3 and U4 are coupled to the NOR gate U6. An output of the NOR gate U5 is coupled to the NOR gate U7, with the second input of the NOR gate U7 being coupled to ground. Similarly, an output of the NOR gate U6 is coupled to the NOR gate U8 with the second input of the NOR gate U8 being coupled to ground.

The NOR gate U7 is coupled through a resistor R10 to the base of a switching transistor T1, while the NOR gate U8 is coupled through a resistor R11 to the base of a switching transistor T2. The transistors T1, T2 are in turn coupled to the SCR's S1 and S2, respectively, through associated resistors R12 and R13, respectively.

The NOR gates U1-U8 function in a logic fashion to controllably energize the two coils, COIL A, COIL B in the same manner as previously discussed with reference to FIG. 2. Consequently, only one example of the operation of the logic circuit 34b will be discussed in detail herein.

As previously discussed, when the first conductor 16-1 is coupled to the + terminal and the second conductor 16-2 is connected to the − terminal of the charged battery 12, and the third conductor 18-1 is connected to the + terminal and the fourth conductor 18-2 is connected to the − terminal of the discharged battery 14, the photo-transistors PT1 and PT5 conduct current. Therefore, the photo-transistors PT1 and PT5 assume a logic one state while the photo-transistors PT4 and PT6 are in a logic zero state. Consequently, the output of the NOR gate U2 will be a logic one with the outputs of the NOR gates U1, U3 and U4 being a logic zero. This result causes the NOR gate U5 to assume a logic zero state while the NOR gate U6 assumes a logic one state, and thus the NOR gate U7 assumes a logic high state with the NOR gate U8 assuming a logic zero state. With the NOR gate U7 having a logic one output and the NOR gate U8 having a logic zero output the transistor T1 is switched on thereby switching its associated SCR S1 on, while the transistor T2 is switched off thereby preventing the SCR S2 from being switched on. Thereafter, when the push button PB1 is depressed COIL A is energized while COIL B remains deenergized, causing the contacts A1, A2 to close coupling the first conductor 16-1 with the third conductor 18-1 and the second conductor 16-2 with the fourth conductor 18-2. The disabled vehicle may then be safely started using the available current from both the charged battery 12 and the discharged battery 14.

The logic circuit 34b will function in a similar manner so that proper polarity requirements are observed when the battery jumper cables of the present invention are coupled to the batteries in some other configuration than that just described.

Furthermore, the safeguards discussed with reference to FIG. 3 can individually, or collectively, be utilized with the logic circuit 34b of FIG. 4 in the same manner as previously discussed.

While the jumper cable apparatus 10 shown utilizes a transfer relay 36 to control the coupling among the conductors 16-1, 16-2, 18-1 and 18-2, with certain modifications to the control circuit 26 the transfer relay 36 could be replaced with SCR's. Modifications required to accommodate the SCR's would be familiar to one skilled in the art.

The breakdown voltage for the zener diodes Z1-Z4 and the values of the resistors R1-R5 are selected according to the particular application of the jumper cable apparatus 10. For example, the components used may differ according to whether the jumper cable apparatus 10 is used in conjunction with automobiles, trucks, railroad equipment, etc.

The control circuit 26 of the present invention could also be adapted to be included as part of a battery charger system or portable motor generator. To do so one of the two sensing circuits 28, 30 could be eliminated as well as the bridge rectifiers BR1, BR2 and certain of the components in the logic circuit 34, 34a. Therein, the state of the transfer relay is determined solely by the polarity of the discharged battery 14 since the charger or generator would have a known high voltage side and a known low voltage side. Consequently, such a jumper cable apparatus would couple the + terminal of the discharged battery 14 to the high side of the charger or generator and the − terminal of the discharged battery 14 to the low voltage side of the charger or generator.

Certain other variations of the disclosed invention are readily apparent to one skilled in the art.

I claim:

1. A starter apparatus for correctly and safely coupling terminals of a battery to a source of power, the source of power having high relative voltage means and low relative voltage means, the battery starter apparatus coomrrsing:.
   a pair of conductors;
   means for connecting said pair of conductors to said battery thereby causing one of said conductors to be at a higher relative potential and the other of said conductors to be at a lower relative potential due to polarity of said battery;
   a control circuit coupled to the pair of conductors and to the source of power;
   the control circuit including means for determining the relative polarity of said pair of conductors and means coupled to said determining means for automatically coupling the conductor of said pair at the higher relative potential to the high relative voltage means of said power source, and the conductor of said pair at the lower relative potential to the low relative voltage means of said power source; and
   the control circuit also including preventive means for inhibiting operation of said coupling means to prevent coupling said pair of conductors to said power source when a potential difference between said pair of conductors does not exceed a preselected level.

2. The starter apparatus defined by claim 1 wherein the connecting means comprise battery clamps.

3. The starter apparatus defined by claim 1 wherein the preventive means includes a plurality of zener diodes, and the preselected level is selected according to breakdown voltages of said zener diodes.

4. The starter apparatus defined by claim 3 wherein the determining means comprise a circuit having a plurality of diodes, the diodes assuming a forward biased state or a reversed biased state according to the polarity of said battery.

5. The starter apparatus defined by claim 4 wherein the control circuit further includes a plurality of opto-isolators, the opto-isolators controlling the coupling of said conductors in response to the biasing of said diodes.

6. The starter apparatus defined by claim 1 wherein the control circuit further includes a transfer relay for coupling said pair of conductors to said power source.

7. A starter apparatus for correctly and safely coupling terminals of a battery to a source of power, the battery starter apparatus comprising:
   a first and a second pair of conductors;
   means for connecting said first pair of conductors to said source of power thereby causing one of said conductors of said first pair to be at a higher relative potential and the other of said conductors of said first pair to be at a lower relative potential, defining a potential difference therebetween, due to polarity of said source of power;
   means for connecting said second pair of conductors to said terminals of said battery thereby causing one of said conductors of said second pair to be at a higher relative potential and the other of said conductors of said second pair to be at a lower relative potential, defining a potential difference therebetween, due to polarity of said battery;

a control circuit coupled to both the first and the second pairs of conductors;

the control circuit including first and second means for determining the relative polarity of both the first and the second pair of conductors, respectively, third and fourth means for determining the potential difference between the conductors of said first pair of conductors, and between the conductors of said second pair of conductors, respectively, and means coupled to said first, second, third and fourth determining means for automatically coupling the conductor of said first pair at the higher relative potential to the conductor of said second pair at the higher relative potential, and the conductor of said first pair at the lower relative potential to the conductor of said second pair at the lower relative potential, regardless of the relative polarity of the first pair of conductors and the relative polarity of the second pair of conductors, only when the potential difference between said first pair of conductors exceeds a preselected level and the potential difference between said second pair of conductors exceeds a preselected level.

8. The starter apparatus defined by claim 7 wherein the connecting means comprises battery clamps.

9. The starter apparatus defined by claim 7 wherein the third and fourth determining means each include a plurality of zener diodes, and the preselected level is selected according to breakdown voltages of said zener diodes.

10. The starter apparatus defined by claim 9 wherein the first and second determining means each include a respective circuit having a plurality of diodes, the diodes assuming a froward biased state or a reversed biased state according to the polarity of said battery and said source of power.

11. The starter apparatus defined by claim 10 wherein the control circuit further includes a plurality of opto-isolators, the opto-isolators controlling the coupling of said conductors in response to the biasing of said diodes.

12. The starter apparatus defined by claim 7 wherein the control circuit further includes a transfer relay for coupling said first and said second pairs of conductors.

13. A control circuit for a battery jumper cable, the battery jumper cable having a first and a second pair of conductors coupled to said control circuit, said first pair of conductors to be coupled to a source of power wherein one of the conductors of said first pair is at a higher relative potential and the other of the conductors of said first pair is at a lower relative potential due to polarity of said source of power, and said second pair of conductors to be coupled to a battery wherein one of the conductors of said second pair is at a higher relative potential and the other of the conductors of said second pair is at a lower relative potential due to polarity of said battery, the control circuit comprising:

first and second means for determining the respective polarity of both said first pair of conductors and said second pair of conductors;

third and fourth means for determining the potential difference between the conductors of said first pair of conductors and the potential difference between the conductors of said second pair of conductors, respectively;

a transfer relay responsive to the first and second determining means for automatically coupling the conductor of said first pair at the higher relative potential to the conductor of said second pair at the higher relative potential and the conductor of said first pair at the lower relative potential to the conductor of said second pair at the lower relative potential, regardless of the relative polarity of the first pair of conductors and the relative polarity of the second pair of conductors; and means associated with the transfer relay and said third and fourth determining means for inhibiting operation of said transfer relay to prevent coupling said conductors when the the relative potential difference between the conductors of each pair does not exceed preselected levels.

14. The starter apparatus defined by claim 13 wherein the third and fourth determining means each include a plurality of zener diodes, and the preselected levels are selected according to breakdown voltages of said zener diodes.

15. The starter apparatus defined by claim 13 wherein the first and second determining means comprises a plurality of diodes, the diodes assuming a forward biased state or a reversed biased state according to the polarity of said battery and said power source.

16. The control circuit defined by claim 13 wherein said control circuit is powered from said source of power.

17. The control circuit defined by claim 13 further comprising a switch coupled to the transfer relay, the transfer relay coupling the conductors only when said switch is actuated.

18. A battery jumper cable apparatus for providing proper polarity coupling between a pair of terminals of a source of power and a pair of terminals of a battery, the battery jumper cable apparatus comprising:

a first and a second conductor, each of said first and second conductors to be connected to one each of the pair of terminals of said source of power;

a third and a fourth conductor, each of said third and fourth conductors to be connected to one each of the pair of terminals of said battery;

first and second means for determining which of said terminals of said pair is at a higher relative potential and which of said terminals of said pair is at a lower relative potential, the first determining means being associated with the first and second conductors, and the second determining means being associated with the third and fourth conductors;

third and fourth means for determining the respective potential difference between said first and second conductors and said third and fourth conductors;

a transfer relay, the transfer relay having a first state wherein neither the first or second conductor is coupled to either the third of fourth conductor, the transfer relay having a second state wherein the transfer relay couples the first conductor with the third conductor and the second conductor with the fourth conductor, and the transfer relay having a third state wherein the transfer relay couples the first conductor with the fourth conductor and the second conductor with the third conductor;

the transfer relay responsive to the first and second determining means assuming the second state when the first conductor is at a higher potential than the second conductor and third conductor is at a higher potential than the fourth conductor, or the second conductor is at a higher potential than the first conductor and the fourth conductor is at a higher potential than the third conductor;

the transfer relay responsive to the first and second determining means assuming the third state when the first conductor is at a higher potential than the second conductor and the fourth conductor is at a higher potential than the third conductor, or the second conductor is at a higher potential than the first conductor and the third conductor is at a higher potential than the fourth conductor;

means for maintaining said transfer relay in said first state when said third or fourth determining means determines that either potential difference is below a preselected level; and the transfer relay otherwise always assuming the first state except when the transfer relay, responsive to the first and second determining means assumes the second state or third state.

19. The battery jumper cable apparatus defined by claim 18 wherein the determining means includes a circuit having a plurality of diodes, the diodes assuming a forward biased state or a reverse biased state according to the polarity of said battery and said power source.

20. The battery jumper cable apparatus defined by claim 18 further comprsing a switch coupled to said transfer relay, the transfer relay coupling the conductors only when said switch is actuated.

21. The battery jumper cable apparatus defined by claim 18 wherein the third and fourth determining means includes a plurality of zener diodes, and the preselected level is selected according to breakdown voltages of said zener diodes.

* * * * *